Figure 1:
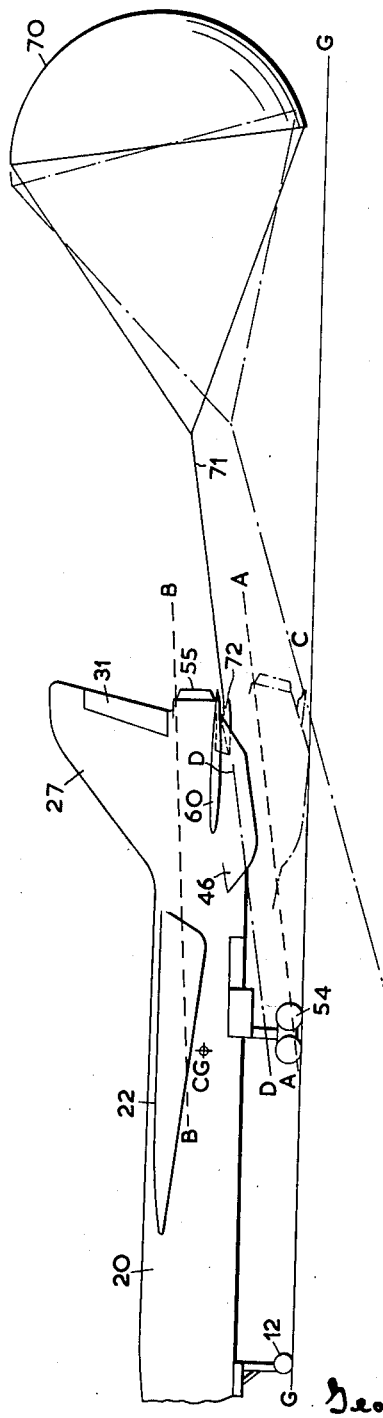

Oct. 16, 1962 G. F. SHARPLES ETAL 3,058,702
BRAKE PARACHUTE ATTACHMENTS TO AIRCRAFT
Filed Jan. 18, 1960 4 Sheets-Sheet 1

Inventors;
Geoffrey F. Sharples
Gerald D. Walley
By: Stevens, Davis, Miller & Mosher, Attorneys Oct. 16, 1962 G. F. SHARPLES ETAL 3,058,702
BRAKE PARACHUTE ATTACHMENTS TO AIRCRAFT
Filed Jan. 18, 1960 4 Sheets-Sheet 3

Inventors:
Geoffrey F. Sharples
Gerald D. Walley
By Stevens, Davis, Miller & Mosher
Attorneys Oct. 16, 1962 G. F. SHARPLES ETAL 3,058,702
BRAKE PARACHUTE ATTACHMENTS TO AIRCRAFT
Filed Jan. 18, 1960 4 Sheets-Sheet 4

Inventors
Geoffrey F. Sharples
Gerald D. Walley
By: Stevens, Davis, Miller & Mosher
Attorneys United States Patent Office 3,058,702
Patented Oct. 16, 1962

3,058,702
BRAKE PARACHUTE ATTACHMENTS TO AIRCRAFT
Geoffrey Francis Sharples, Blackpool, and Gerald David Walley, Freckleton, near Preston, England, assignors to The English Electric Company Limited, London, England, a British company
Filed Jan. 18, 1960, Ser. No. 2,960
Claims priority, application Great Britain Feb. 5, 1959
6 Claims. (Cl. 244—110)

The invention relates to brake parachute attachments for aircraft.

When an aircraft lands in a crosswind, a tail parachute with simple attachment tends to drift downwind and to produce a considerable side-force on the rear of the aircraft. This force may overcome the nosewheel steering power of the aircraft and necessitate differential brake application on the main wheels, which, since the brakes will already be fully applied, can only lead to a reduction in effective braking force and a longer landing run. In extreme cases, tyre friction will be insufficient to prevent the aircraft from being forced sideways off the runway.

The simplest solution would be to anchor the parachute cable to the aircraft as close to the centre of gravity position as possible, but this involves a heavy structure, and some means of limiting the movement of the cable must be provided if damage to the rear of the aircraft is to be prevented.

It is an object of the present invention to provide a brake parachute attachment enabling an aeroplane to maintain a steady path on the runway when landing, in spite of the parachute cable dragging at an angle to its line of run, owing to cross winds.

Other objects of the invention will become apparent later from this specification and its accompanying drawings.

According to the present invention the parachute cable is attached on anchoring means which are capable of traversing across the width of the tail end of the aircraft fuselage. Preferably these anchoring means comprise an arcuate rail having its center of curvature substantially at the center of gravity of the aircraft at least in the plan configuration of the aircraft, so that the lateral component of the pull of the brake parachute when drifting downwind does not produce a yaw moment, about the center of gravity.

This arrangement is particularly suitable for aircraft with side-by-side jet engines and nozzles at the rear of the fuselage, where sufficient width is available for such an anchorage rail. In one embodiment, this rail may be attached to the underside of the fuselage below the jet nozzles. In an alternative embodiment, the rail may be attached on top of the jet nozzles which arrangement has some advantages in that the line of force of the brake parachute cable passes near the centre of gravity also in elevation, both in the "all wheels down" attitude and in the "tail down" attitude of a tricycle undercarriage aircraft. The lateral travel of the anchorage means is limited by lateral stops to such an extent as to prevent interference of said cable with the tailplane of the aircraft.

In the first embodiment, the arrangement allows the inclusion of the anchorage rail in the door of the parachute bay. The operation of this door permits the parachute to be streamed and also lowers the rail at a suitable distance from the bottom of the fuselage to provide clearance.

A release mechanism extending over the full width of the rear fuselage permits the brake parachute to jettison from any position of its anchorage means on the said rail.

Figure 2:
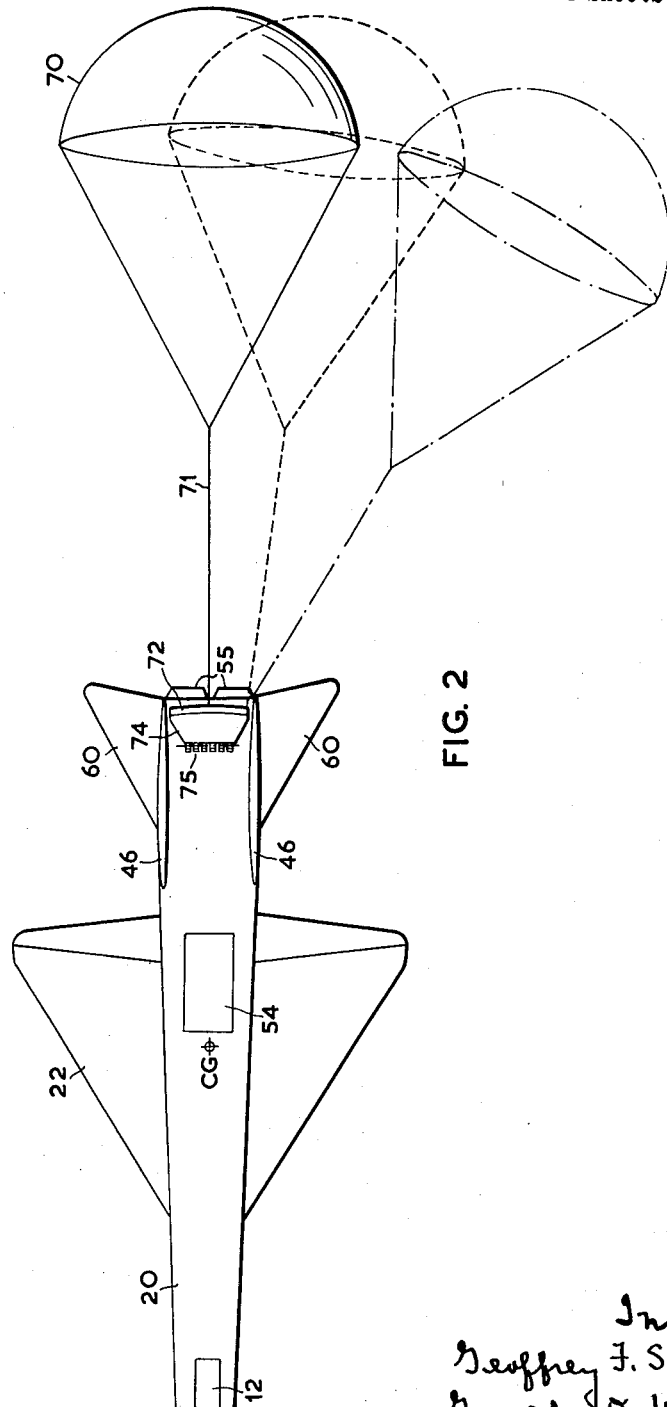
Figure 3:
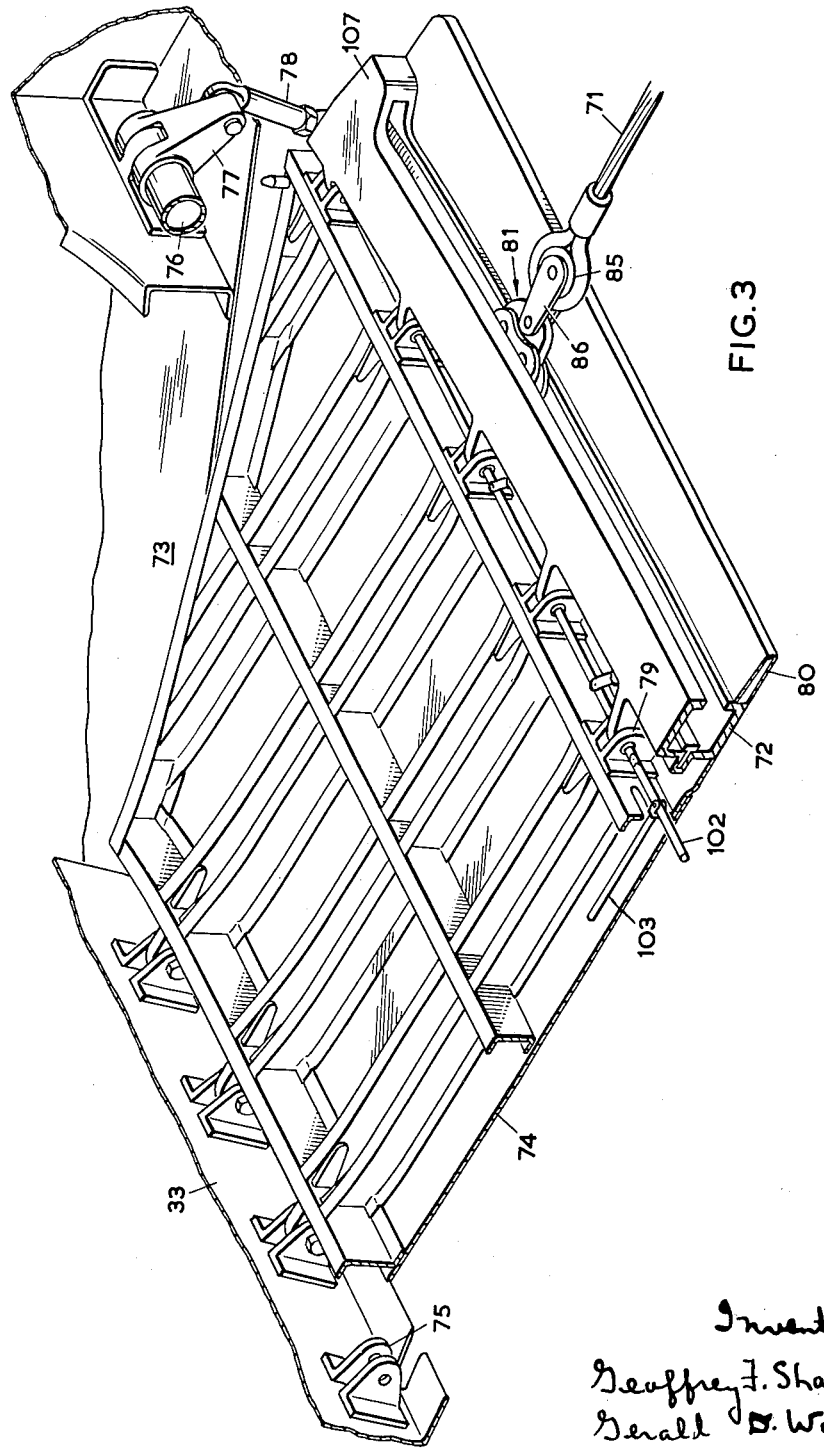
Figure 4:
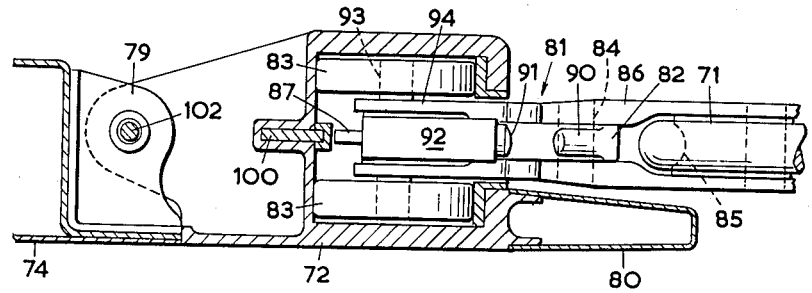
Figure 5:
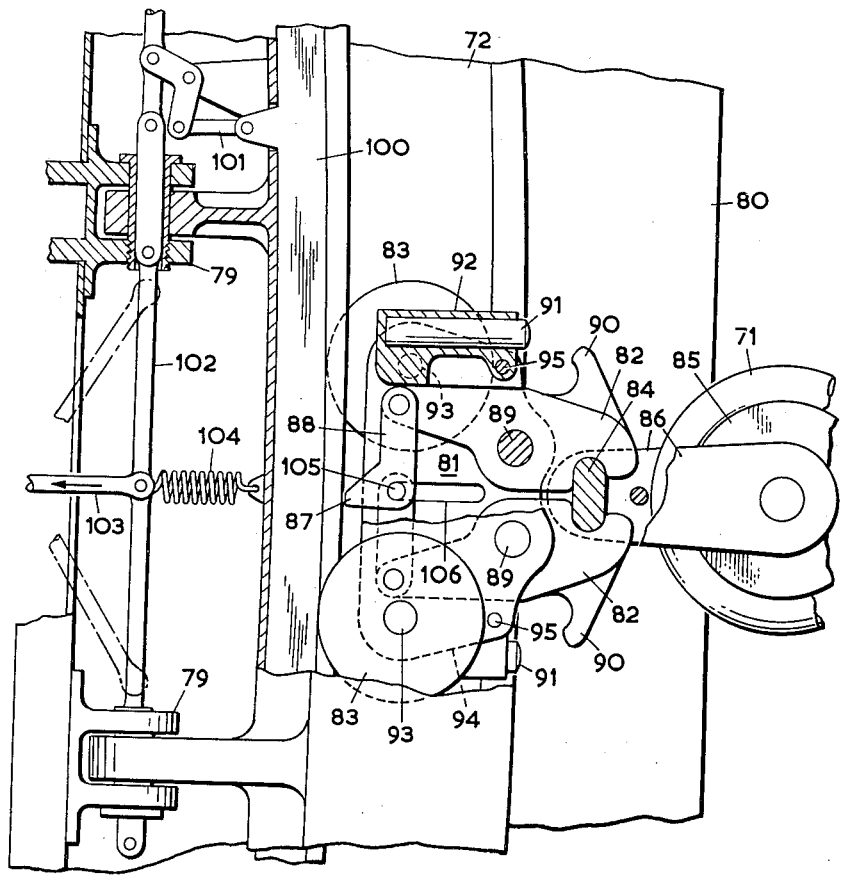

In order that the invention may be clearly understood and readily carried into effect, an embodiment thereof will now be described by way of example with reference to the accompanying drawings, in which:

FIG. 1 is a broken off side elevation of an aircraft and its brake parachute, showing various attitudes to the ground line, FIG. 2 is an inverted plan view to FIG. 1 showing various side travel positions of the brake parachute, FIG. 3 is a perspective view partly broken off, of a parachute door and anchorage attachment, FIG. 4 is a side elevation and FIG. 5 is a plan view, both partly in section, of a detail of FIG. 3 on a larger scale.

Referring first to FIGS. 1 and 2, an aircraft having a fuselage 20, a wing 22, a dorsal fin 27 and rudder 31, twin tail fins 46, a nose wheel 12, a main undercarriage 54 (both retracted in FIG. 2 for clarity), twin jet pipes 55 arranged side by side is shown in full lines as standing with all wheels down on the ground line G—G with a streamed large brake parachute 70 attached by a cable 71 to a rail 72 forming part of a circular arc, struck about a center, which is just aft of the center of gravity CG of the aircraft in the plan configuration, but is capable of movement in a vertical arc above or below the center of gravity position of the aircraft in accordance with the line of action of the parachute when streamed. The line D—D of the cable 71 passes below this center of gravity.

In the folded condition the parachute is stowed in a stowage compartment 73 (FIG. 3) underneath the jet pipes 55, and closed by a bottom door 74 hinged to the bottom of the tail fairing 33 about transverse horizontal hinges 75.

In FIG. 1 the tail end of the aircraft is indicated in chain dotted lines in the tail down attitude. It will be seen that in this attitude the line C—C of the cable 71 is considerably further below the center of gravity of the aircraft than in the "all wheels down" attitude.

Alternatively a brake parachute attachment above the jet pipes 55 is diagrammatically indicated in which case the line B—B of the cable 71 passes slightly above the center of gravity of the aircraft in the "all wheels down" attitude, and the line A—A passes below the center of gravity of the aircraft in the "tail down" attitude, but not so far as with the brake parachute attachment below the jet pipes 55.

In FIG. 2 the brake parachute 70 is shown in full lines straight behind the aircraft, in dotted lines at maximum travel along the rail 72, and in chain-dotted lines at maximum travel before possible interference with the tail plane 60.

Referring now to FIG. 3, the door 74 is hinged to the bottom of the rear fairing 33 of the fuselage about door hingles 75. A torque tube 76 is journalled parallel to the hinge line of 75, and its arm 77 is linked to the door 74 by a connecting rod 78. The torque tube 76 is rotated by a jack (not shown) mounted in the fuselage in order to raise and lower the door 74.

The rail structure 72 is hinged to the rear edge of the door 74 about hollow hinges 79 and is of a square profile open at the back. A cable stowage tray 80 forms the continuation of the bottom of the rail structure 72 to the rear. Stops 107 limit the lateral travel of a trolley denoted 81 as a whole which is guided by four rollers 83 in the said rail structure 72 (FIGS. 4 and 5) and can traverse between stops 107 at each end of the rail. Two jaws 82 pivoted by pivot pins 89 on the said trolley 81 clamp a release pin 84 between them to which a large thimble 85 for the parachute cable 71 is attached by two webs 86 (FIGS. 4 and 5).

At the rear of the profile of the rail 72 a release strip 100 extending over the whole rail 72 is mounted slidably in the longitudinal direction of the aircraft, which strip co-operates with the nose 87 of toggle links 88 connecting the rear ends of the jaws 82 which in the position shown lock the release pin 84 between them. These jaws 82 are provided with outward extensions 90 which strike friction damper pins 91 on rotation of jaws 82 about pivot pins 89. The friction damper assemblies including pins 91 are housed in blocks 92 which also form the roller stub axles 93 protruding through side webs 94. A bolt 95 through the rear end of each of these blocks 92 prevents any rotation of these assemblies when absorbing the energy of the rotating jaws 82 on release of cable 71. Under the pull of the parachute cable 71, the jaws 82 tend to rotate and are prevented from doing so by the toggle links 88 which lock up over top dead centre. These links 88 are held up by a small leaf spring, (not shown), preventing inadvertent release of the cable, should the links tend to move in the opposite direction. The cable can only be released by depressing the nose 87, correct movement and travel of these links being obtained by the ends of pin 105 protruding into grooves 106 in each side web 94.

A release strip 100 is linked by linkage 101 to articulated release rods 102 which are co-axial with, and pass with clearance through the hollow hinges 79 of the rail structure 72. When a connecting rod 103 is pulled by an actuator (not shown) in the direction of the arrow against the bias of a spring 104, the release actuating strip 100 is pushed in the opposite direction and bears on the nose 87, thereby breaking the alignment of the toggle links 88 and swinging the jaws 82 apart so as to release the release pin 84 and to jettison the brake parachute 70 in any position of the trolley 81 along the said rail 72.

What we claim as our invention and desire to secure by Letters Patent, is:

1. A brake parachute attachment to the fuselage of an aeroplane, comprising in combination: a guide rail extending transversely of the tail end of the said fuselage, an anchoring means slidably mounted on the said guide rail and capable of traversing the said tail end along said guide rail, and a brake parachute cable detachably attached to the said anchoring means.

2. A brake parachute attachment as claimed in claim 1, comprising a release mechanism extending over the full width of the said tail end permitting to jettison the said brake parachute from any position of the said anchoring means transverse of the said tail end.

3. A brake parachute attachment as claimed in claim 1, wherein the said guide rail is arcute about a vertical axis, having its center of curvature just aft of the center of gravity of the aeroplane in the plan configuration of the aeroplane.

4. A brake parachute attachment as claimed in claim 1, for an aeroplane having at least one propulsion nozzle arranged in the said tail end of the fuselage, wherein the said guide rail is arranged below the said jet propulsion nozzle.

5. A brake parachute attachment as claimed in claim 1, comprising lateral stops at either end of the said guide rail limiting the lateral travel of the said anchoring means.

6. A brake parachute attachment as claimed in claim 1 for an aeroplane having a brake parachute bay in the said tail end of the fuselage and a door to the said parachute bay, wherin the said guide rail is attached to the tail end adjacent the said door of the brake parachute bay.

References Cited in the file of this patent

UNITED STATES PATENTS

| | | |
|---|---|---|
| 2,363,732 | Jenkins | Nov. 28, 1944 |
| 2,471,544 | Ring | May 31, 1949 |
| 2,511,601 | Smith | June 13, 1950 |
| 2,513,867 | Heffernan | July 4, 1950 |
| 2,631,797 | Smith | Mar. 17, 1953 |
| 2,920,598 | Nielson | Jan. 12, 1960 |

FOREIGN PATENTS

| | | |
|---|---|---|
| 787,102 | Great Britain | Dec. 4, 1957 |
| 792,022 | France | Dec. 21, 1935 |